Patented Nov. 29, 1938

2,138,039

UNITED STATES PATENT OFFICE 2,138,039

TREATMENT AND PACKAGING OF ETHER

Ferdinand W. Nitardy, Brooklyn, N. Y., assignor to E. R. Squibb & Sons, New York, N. Y., a corporation of New York No Drawing. Original application July 1, 1932, Serial No. 620,427. Divided and this application July 11, 1936, Serial No. 90,187

6 Claims. (Cl. 23—250)

This invention relates to the treatment and packaging of ether to remove oxygen therefrom and thus to prevent the formation of oxidative impurities therein.

Ether deteriorates by reacting with oxygen to form peroxides, which in turn by interaction and/or decomposition yield aldehydes and other substances. Herein the term "oxidative impurities" embraces all such peroxides, aldehydes, and related contaminating products. This deterioration increases, of course, with lapse of time, and is favored by the following circumstances: the presence, which is usual, of dissolved oxygen in the ether as ordinarily manufactured; exposure to light, particularly direct sunlight; and heat, especially when the ether is in a sealed vessel. A small proportion of these oxidative impurities suffices to render the ether unfit for anesthetic use, and otherwise diminishes its value.

It is the object of this invention to provide a method and a package whereby oxygen may be removed from ether in order to prevent the formation of oxidative impurities therein and so to keep the ether suitable for inducing anesthesia.

In the practice of this invention the ether to be treated is contacted, preferably under anaeric conditions, with a ferrous compound, preferably in a form presenting a large surface. Among the many ferrous compounds efficacious for the purpose are the chloride, hydroxide, oxide, and sulfate, preferably deposited on the interior of the container, as by means of a phenol-formaldehyde condensate, or used to impregnate material introduced into the container. The ferrous compound should preferably be ether-insoluble (to avoid unduly contaminating the ether); and, manifestly, the ferrous compound, as well as its oxidation products, should be nontoxic.

Apparently iron in the ferrous state possesses a greater affinity for oxygen than does ether, and is therefore able to combine with the dissolved oxygen in preference to the ether. Whatever may be the correct theory of their operation, ferrous compounds remove dissolved oxygen from ether and, even under such adverse conditions as the presence of light and heat, maintain such ether virtually free from oxidative impurities for an indefinite period.

For example, a sheet of filter paper six inches long and two inches wide, that has been impregnated with a 10% solution of ferrous sulfate and dried anaerically, may be confined with a quarter-pound of ether in an ordinary sealed tin container. Or a ferrous compound—say, the acetate, benzoate, chloride, hydroxide, lactate, oxide, or phosphate—may be adsorbed in a known manner upon a carrier, preferably an inert porous material (as clay plates or chunks of pumice), and such impregnated carrier may be suitably contacted, by percolation or immersion or otherwise, with the liquid or vaporized ether.

It will be understood that the specific details herein set forth are merely illustrative and by no means limitative of the invention, which may be variously otherwise embodied—for instance, as to the particular ferrous compounds used, the modes of applying them to the ether, and the packages employed—within the scope of the appended claims.

I claim:

1. The process that comprises contacting ether anaerically with an ether-insoluble, nontoxic ferrous, compound in such amount and condition as to present peroxide formation but not to contaminate the ether materially.

2. A package comprising a container having therein ether and an ether-insoluble, nontoxic ferrous compound in such amount and condition as to prevent peroxide formation but not to contaminate the ether materially.

3. The process that comprises contacting ether with a ferrous compound selected from the class consisting of the acetate, benzoate, chloride, hydroxide, lactate, oxide, phosphate, and sulfate.

4. A package comprising a container having therein ether and a ferrous compound selected from the class consisting of the acetate, benzoate, chloride, hydroxide, lactate, oxide, phosphate, and sulfate.

5. The process that comprises contacting ether with ferrous sulfate.

6. A package comprising a container having ether and ferrous sulfate therein.

FERDINAND W. NITARDY.

CERTIFICATE OF CORRECTION.

Patent No. 2,138,039. November 29, 1938.

FERDINAND W. NITARDY.

It is hereby certified that error appears in the printed specification of the above numbered patent requiring correction as follows: Second column, line 25, claim 1, after "ferrous" strike out the comma; line 26, same claim, for the word "present" read prevent; and that the said Letters Patent should be read with this correction therein that the same may conform to the record of the case in the Patent Office.

Signed and sealed this 31st day of January, A. D. 1939.

Henry Van Arsdale

(Seal) Acting Commissioner of Patents.